US008832359B2

(12) United States Patent
Kanamori

(10) Patent No.: US 8,832,359 B2
(45) Date of Patent: Sep. 9, 2014

(54) IN-VEHICLE APPARATUS

(71) Applicant: DENSO Corporation, Kariya (JP)

(72) Inventor: Motoki Kanamori, Takahama (JP)

(73) Assignee: DENSO CORPORATION, Kariya (JP)

( * ) Notice: Subject to any disclaimer, the term of this patent is extended or adjusted under 35 U.S.C. 154(b) by 167 days.

(21) Appl. No.: 13/628,858

(22) Filed: Sep. 27, 2012

(65) Prior Publication Data

US 2013/0091323 A1    Apr. 11, 2013

(30) Foreign Application Priority Data

Oct. 7, 2011    (JP) .................. 2011-222783

(51) Int. Cl.
*G06F 12/00*    (2006.01)
*G06F 9/445*    (2006.01)
(52) U.S. Cl.
CPC ..................................... *G06F 9/445* (2013.01)
USPC .................... 711/103; 711/162; 711/E12.008
(58) Field of Classification Search
None
See application file for complete search history.

(56) References Cited

U.S. PATENT DOCUMENTS

| 6,067,398 A | 5/2000 | Sato |
| 6,845,438 B1 | 1/2005 | Tanaka et al. |
| 2011/0258427 A1 | 10/2011 | Kanamori |

FOREIGN PATENT DOCUMENTS

JP    A-H11-53271    2/1999

*Primary Examiner* — Kevin Verbrugge
(74) *Attorney, Agent, or Firm* — Posz Law Group, PLC

(57) ABSTRACT

An in-vehicle apparatus includes: a flash memory; a memory controller for executing an initialization process; a backup power source; a power source; a controller; and a power source controller. According to incompletion of initialization, the controller executes standby/boot process. According to completion of initialization, the controller executes the boot process. According to reception of data backup instruction, the controller stores data in the memory. The power source controller switches to a trigger standby mode. According to trigger, the power source controller inputs the energization instruction to the power source. According to termination of trigger, the power source controller inputs the data backup instruction to the controller. According to completion of backup, the power source controller halts to input the energization instruction, and switches to the trigger standby mode. According to incompletion of backup, the power source controller resets the switch and the power source.

7 Claims, 9 Drawing Sheets

IN-VEHICLE APPARATUS

CROSS REFERENCE TO RELATED APPLICATION

This application is based on Japanese Patent Application No. 2011-222783 filed on Oct. 7, 2011, the disclosure of which is incorporated herein by reference,

TECHNICAL FIELD

The present disclosure relates to an in-vehicle apparatus having a flash memory as a boot device memory, which stores a boot program,

BACKGROUND

An in-vehicle electric apparatus such as an in-vehicle navigation apparatus includes, in general, a flash memory as a general memory. For example, JP-A-H09-182010 corresponding to U.S. Pat. No. 6,067,398 teaches such an apparatus. This type of the flash memory includes an IPL (i.e., initial program loader), a flash memory for storing an OS (i.e., operating system) and an application program, and a flash memory card for a map medium. The flash memory for the boot device is a NOR type flash memory. Therefore, dimensions of the memory are large, and a manufacturing cost is high. On the other hand, the flash memory card for the map medium is a NAND type flash memory, and therefore, dimensions of the memory are small, and a manufacturing cost is low, and further, a memory capacity is large. Thus, when the NAND type flash memory is used for the boot device, the manufacturing cost is reduced.

The NAND type flash memory includes an inherent failure block in multiple memory blocks, which provide the flash memory. Further, when the flash memory functions, a new failure block is generated. Thus, the memory card controller controls the flash memory not to use such a failure block. Further, the NAND type flash memory has the limitation of the number of rewritable times. The memory card controller also manages the number of rewritable times of the flash memory.

In the NAND type flash memory such as a SD card, in order to manage the number of rewritable times and the failure blocks, the memory card controller executes an initialization setting process when a power source energizes a system, i.e., when an accessory switch turns on. Here, in the initialization setting process, the memory card controller searches (scans) all of the flash memories, and the memory card controller searches or scans conversion tables stored in the flash memories. The memory card controller spends about one second at maximum for completing the initialization setting process. This is obtained by actual measurement results. Accordingly, when the SD card is used for the boot device, for example, the CPU can not access the flash memory while the memory card controller executes the initialization setting process. As a result, a reading process of the CPU for reading an IPL initially from the flash memory is delayed. Thus, the activation of a soft ware such as an OS is also delayed, so that a response of communication to an in-vehicle LAN may not be on time.

Thus, even when the accessory switch is off, but a backup power source connecting to the battery is coupled with the SD card so that the initialization setting process is only performed in a manufacturing process of the system after the system is energized. Thus, the initialization setting process of the SD card is not performed under a condition that an user utilizes a vehicle, which mounts the system.

The CPU controls the SD card to store backup data therein when the accessory switch turns off. When the CPU can not control the SD card to backup the data normally, it is necessary to reset the SD card since the backup process of the SD card is not completed normally.

However, when the system includes the above features, it is necessary to initialize the SD card when the accessory switch turns on. Thus, when the SD card is initialized, the initialization setting process is executed in the SD card. Thus, the activation of the soft ware is delayed.

SUMMARY

It is an object of the present disclosure to provide an in-vehicle apparatus having a NAND type flash memory as a boot device memory, which stores a boot program. In a case where a controller controls the flash memory to backup data before an activation trigger for activating the controller turns off, even when the controller resets the NAND type flash memory since the flash memory can not backup the data normally, the in-vehicle apparatus activates a soft ware on time in the next activation time.

According to an example aspect of the present disclosure, an in-vehicle apparatus includes: a memory having a NAND type flash memory and a memory controller, wherein the NAND type flash memory stores a boot program and another program, which is read out according to execution of the boot program, and wherein the memory controller executes an initialization setting process in such a manner that the memory controller searches all of failure blocks in the NAND type flash memory when the in-vehicle apparatus is energized, and manages a relation between a logic block and a physical block with eliminating searched failure blocks; a backup power source for transforming a voltage of a battery to a first voltage, wherein the battery is mounted on a vehicle; a power source switch coupled between the backup power source and the memory so that the backup power source applies the first voltage to the memory when the power source switch is in an on-state; a main power source coupled with the backup power source so that the main power source generates a second voltage based on the first voltage when an energization instruction is input; a main control unit coupled with the main power source; and a power source control unit coupled with the backup power source. The main control unit is activated when the main power source applies the second voltage to the main control unit. The main control unit determines whether the initialization setting process is completed by the memory controller after the main control unit is activated. When the main control unit determines that the initialization setting process is not completed, the main control unit executes a standby process for waiting for completion of the initialization setting process, and executes a boot process for reading the boot program from the memory after the standby process. When the main control unit determines that the initialization setting process is completed, the main control unit executes the boot process without executing the standby process. When the main control unit receives a data backup instruction, the main control unit stores a backup data in the memory. When the backup power source applies the first voltage to the power source control unit, the power source control unit is activated. When the power source control unit is activated, the power source control unit controls the power source switch to turn on, and switches to an activation trigger standby mode, in which the power source control unit waits for generation of an activation trigger. When the power source control unit is in the activation trigger standby mode, and the activation trigger is generated, the power source control unit inputs the energization instruction to the main power source. When the activation trigger is terminated after an input of the energization instruction to the main power source, the power source control unit inputs the backup instruction to the main control unit. When the main control unit completes the data backup normally, the power source control unit halts to input the energization instruction to the main power source, and switches to the activation trigger standby mode. When the main control unit does not complete the data backup normally, the power source control unit controls the power source switch to turn off and on so that the power source switch is reset, and further, the power source control unit halts to input the energization instruction to the main power source, and inputs the energization instruction to the main power source again.

In the above apparatus, when the vehicle is delivered to an user of the vehicle, and the user executes the accessory-on operation, i.e., when the activation trigger is generated, the power source control unit controls the main power source to energize the main control unit so that the main control unit is activated. In this case, since the memory has already completed the initialization setting process, it is not necessary to execute the initialization setting process again although it takes much time to complete the initialization setting process. Thus, the main control unit immediately executes the boot process for reading out the boot program from the memory. After the boot program is executed, the apparatus can immediately respond to an instruction from an external device.

When the activation trigger is terminated, the main control unit controls the memory to store the backup data according to the backup instruction. If the main control unit fails to control the memory to store the backup data successfully, the power source control unit determines that the failure occurs, and the power source control unit resets the power source switch. Further, the power source control unit halts to input the energization instruction to the main power source. Thus, the failure state is solved. In this case, since the power source switch is reset so that the power source switch turns off and on, the backup power source immediately energizes the memory just after the backup power source stops energizing the memory. Accordingly, the memory controller of the memory executes the initialization setting process. Thus, even if the data backup is not completed normally after the activation trigger is terminated, the initialization setting process is executed immediately without waiting for the next activation trigger. Therefore, when the next activation trigger is generated, since the initialization setting process has been already completed, the main control unit immediately executes the boot process for reading out the boot program from the memory, so that the boot program is executed immediately.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

An in-vehicle apparatus according to a first embodiment will be explained with reference to FIGS. 1 to 9.

Figure 1:
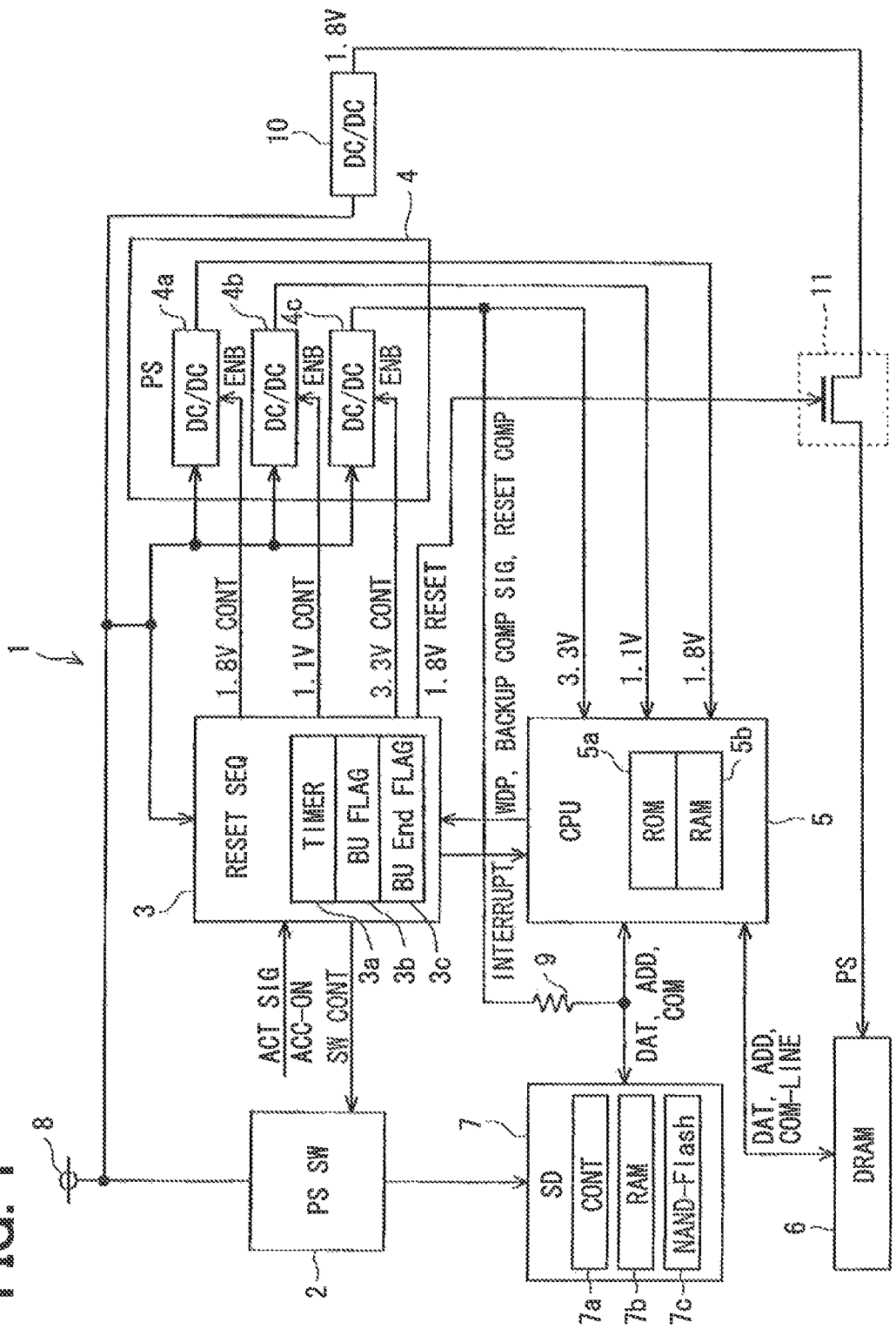
FIG. 1 is a diagram showing a whole system of a first embodiment.

FIG. 1 shows a whole structure of an in-vehicle navigation apparatus 1, which corresponds to the in-vehicle apparatus. The apparatus 1 includes a power source switch 2, a reset sequencer 3 corresponding to a power source controller, a power source 4, a CPU 5 corresponding to a controller, a DRAM 6 corresponding to a backup memory, a SD card 7 corresponding to a memory, and the like. The apparatus 1 is activated when the backup power source 8 (BU power source) energizes the apparatus 1. The BU power source 8 continues to energize the apparatus 1 even when an ignition switch of a vehicle turns off so that a main power source turns off. The BU power source 8 decreases a battery voltage such as 12 volts to a first voltage such as 3.3 volts, and then, the power source 8 energizes the apparatus 1 with 3.3 volts. The BU power source 8 is connected to the power source switch 2, the reset sequencer 3 and the power source 4. Accordingly, when the apparatus 1 is coupled with the BU power source 8, the BU power source 8 energizes the power source switch 2, the reset sequencer 3 and the power source 4.

The power source switch 2 is connected to the SD card 7. When the power source switch 2 turns on, i.e., when the power source switch 2 is in an operation mode, the BU power source 8 is coupled with the SD card 7. The power source 4 includes DC/DC converters 4a-4c therein. The power source 4 generates a second voltage such as 3.3 volts, 1.1 volts and 1.8 volts according to an ENB signal from the reset sequencer 3. Here, the ENB signal corresponds to an energization instruction as an energization signal. Then, the power source 4 outputs the second voltage to the CPU 5. The reset sequencer 3 includes a timer 3a, a backup flag 3b (i.e., BU flag) corresponding to an initialization setting process determination, value, a backup end flag 3c (i.e., BU End flag) corresponding to a backup completion determination value and the like. The BU flag 3b and the BU End flag 3c indicate an off status when the BU power source 8 energizes the reset sequencer 3 so that the reset sequencer 3 is activated. The reset sequencer 3 receives an accessory-on signal from an ignition switch of the vehicle. The reception of the accessory-on signal corresponds to an on state of an activation trigger. The accessory-on signal is a level signal so that, for example, the accessory-on signal indicates a high level when the ignition switch is disposed at an accessory position. The reset sequencer 3 controls the power switch 2 and the power source 4 according to the reception of the accessory-on signal. Alternatively, a power source may be a series power source.

The SD card 7 includes a controller 7a, a RAM 7b, and a NAND type flash memory 7c therein. The controller 7a controls a failure block in the NAND type flash memory 7c with using a conversion table stored in the RAM 7b. The conversion table indicates a corresponding relationship between a logic block and a physical block.

Specifically, the NAND type flash memory 7c is divided into multiple memory blocks. Each memory block provides a minimum unit when data in the memory block is deleted. The blocks in the NAND type flash memory 7c includes an initial failure block and a later failure block. The initial failure block is generated when the flash memory 7c is manufactured. The later failure block is generated in use after the flash memory 7c is manufactured. The controller 7a controls the blocks so as not to use the failure blocks. The data control of the NAND type flash memory 7c is performed by an additional writing system so that an update data is written hi an already deleted region, and a region, in which original data exists, is deleted when the data is updated. Accordingly, a physical block, in which data corresponding to a logic block exists, is not fixed, but is shifted in the memory. Accordingly, the controller 7a searches a storing region for logic block address information of all physical blocks. Then, the controller 7a generates a conversion table between the logic block and the physical block. The searching operation of all blocks is performed once when the SD card 7 is energized since the physical block corresponding to the logic block is immediately determined according to the conversion table after the conversion table is generated. Specifically, the searching operation of all blocks is performed once every time when the power source switch 2 switches from an off state to an on state so that the BU power source 8 energizes the navigation apparatus 1. Here, the searching operation corresponds to an initialization setting process, which is performed once every time the power activation is executed. The controller 7a updates the conversion table between a logic address and a physical address when the data is updated and a position of the physical block corresponding to the data is changed. Thus, the conversion table is always updated so that the table is ready for a next access to the SD card 7.

The SD card 7 is coupled with the CPU 5 via a data line, an address line and a command line. These lines are connected to a 3.3 volt line of the CPU 5, which is a power source line, via a pull-up resistor 9 according to the specification of the SD card 7. The NAND type flash memory 7c of the SD card 7 stores an IPL (an initial program loader corresponding to a boot program), an OS (an operating system corresponding to a program read out by execution of the boot program), an application program, map data and the like. The IPL is a minimum program for the CPU to read the OS.

The CPU 5 controls the DRAM 6 to store data. The DRAM 6 is energized via a DC/DC converter 10 and the power source switch 11 so that the memorized state of data is maintained. The DC/DC converter 10 is coupled with the BU power source 8. When a failure occurs, the reset sequencer 3 controls the power source switch 11 to turn off, so that the DRAM 6 is reset.

In view of the above described operating conditions of the SD card 7, it takes time to perform the initialization setting process by the controller 7a when the power is activated. During the initialization setting process, the CPU 5 can not access the SD card 7. The initialization setting process time of the SD card 7 depends on a manufacturer and a specification of the SD card 7. The present inventor confirms that the maximum initialization setting process time is about one second. Thus, the CPU 5 can not access the SD card 7 for about one second at most when the SD card 7 is energized. During the initialization setting process time, the IPL can not be read out from the SD card 7. Thus, the apparatus 1 can not respond to a request via the in-vehicle LAN.

Thus, the reset sequencer 3 and the CPU 5 function as follows.

Figure 2:
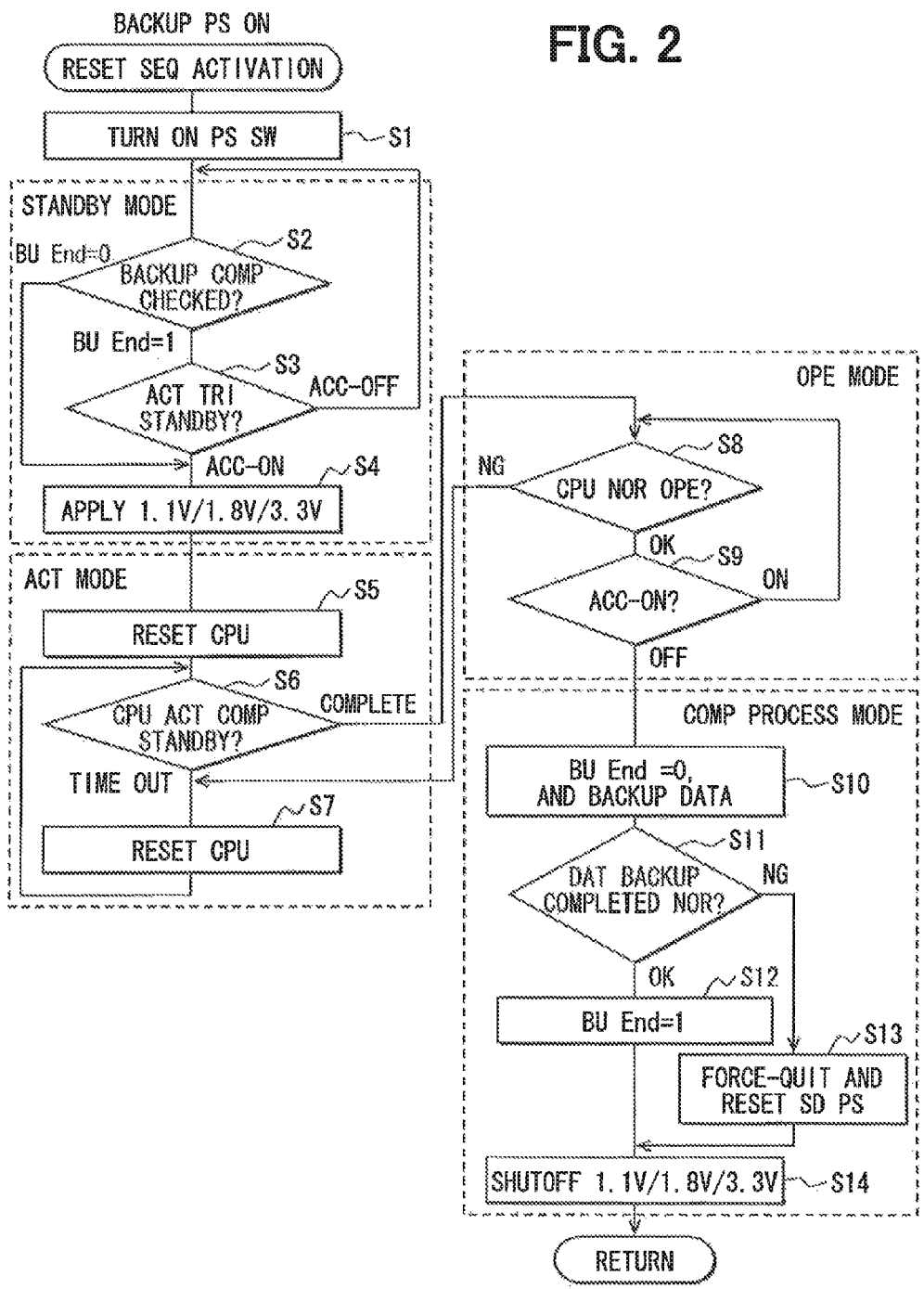
FIG. 2 is a flowchart showing an operation of a reset sequencer.

FIG. 2 is a flowchart showing an operation of the reset sequencer 3. When the navigation apparatus 1 is connected to the BU power source 8, the reset sequencer 3 is energized and activated. When the reset sequencer 3 is activated, the reset sequencer 3 controls the power source switch 2 to turn on in step S1. The BU power source 8 is connected to the SD card 7 so that the SD card 7 is energized. The energization state of the SD card 7 with using the BU power source 8 continues when the battery is coupled with the vehicle. The initialization setting process is performed only once just after the BU power source 8 is connected to the apparatus 1, in general. However, when the battery is charged again after the battery is completely discharged, when the battery is renewed, or when the navigation apparatus 1 is reconnected to the BU power source 8, the reset sequencer 3 is activated, so that the initialization setting process is executed again. When the reset sequencer 3 controls the power source switch 2 to turn on and off, the energization from the BU power source 8 to the SD card 7 is interrupted. Then, when the energization from the BU power source 8 to the SD card 7 is recovered, i.e., the power is activated again, the initialization setting process is executed again. Further, as described later, when the CPU 5 is reset, the CPU 5 initializes the SD card 7, and therefore, the initialization setting process is executed again.

When the reset sequencer 3 is activated, the reset sequencer 3 becomes a stand-by mode, which corresponds to an activation trigger stand-by mode. Then, the reset sequencer 3 checks completion of the backup according to the BU End flag in step S2. The BU End flag represents "1" when the data backup is normally completed. The BU End flag represents "0" when the reset sequencer 3 is activated for the first time, i.e., when the navigation apparatus 1 is firstly connected to the BU power source 8 so that the reset sequencer 3 is activated for the first time. Thus, in step S3, the reset sequencer 3 stands by until the activation trigger occurs. When an operator, who attaches the navigation apparatus 1 to the vehicle, turns the ignition switch to an accessory-on position in order to confirm the operation of the apparatus 1, the apparatus 1 receives the accessory-on signal so that the activation trigger occurs or turns on, i.e., the determination in step S3 indicates "ACC-ON." Then, in step S4, the ENB signal is input to the power source 4 so that 1.1 volts, 1.8 volts or 3.3 volts is applied to the CPU 5. Thus, the CPU 5 is reset in step S5.

When the CPU 5 is reset in step S5, the CPU 5 initializes the SD card 7.

Figure 8:
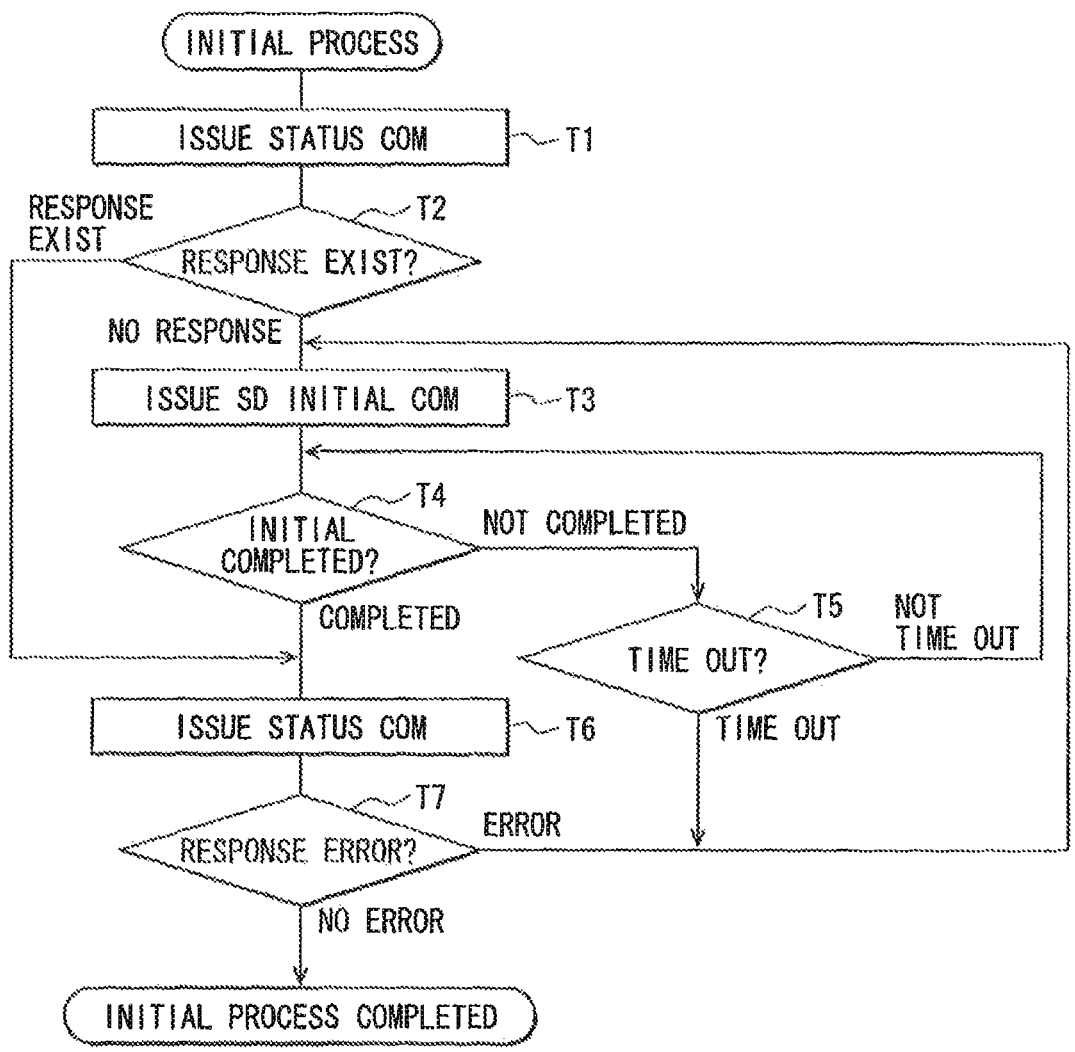
FIG. 8 is a flowchart showing an initialization process of the CPU.

FIG. 8 is a flowchart showing an initialization process of the SD card 7, which is executed by the CPU 5. The CPU 5 generates a status command for the SD card 7 in step T1. Then, the CPU 5 determines in step T2 whether a response from the SD card 7 exists. When the SD card 7 is an "idle" state, which represents that the initialization setting process is not completed, the access to the SD card 7 is impossible. Accordingly, in this case, the response does not exist, i.e., the determination in step T2 is "NO RESPONSE." Then, in step T3, the CPU 5 generates a SD initialization command. Then, the CPU 5 determines in step T4 whether the SD card 7 is initialized. Further, the CPU 5 determines in step T5 whether time runs out. When time runs out without completing the initialization, i.e., when the determination of step T5 is "TIME-OUT," the CPU 5 generates the SD initialization command again in step T3. When the initialization setting process in the SD card 7 is completed before time runs out, i.e., when the determination of step T4 is "COMPLETED," the CPU 5 generates the status command in step T6. Then, in step T7, the CPU 5 confirms whether the response error occurs. When the response error does not exist, i.e., when the determination in step T7 is "NO ERROR," the CPU 5 ends the initialization of the SD card 7. When the response error exists, i.e., when the determination in step T7 is "ERROR," the CPU 5 generates the SD initialization command again in step T3. In this case, the SD card 7 switches from the "idle" state to the "tran" state when the initialization setting process is completed, so that the CPU 5 can access the SD card 7.

Figure 9:
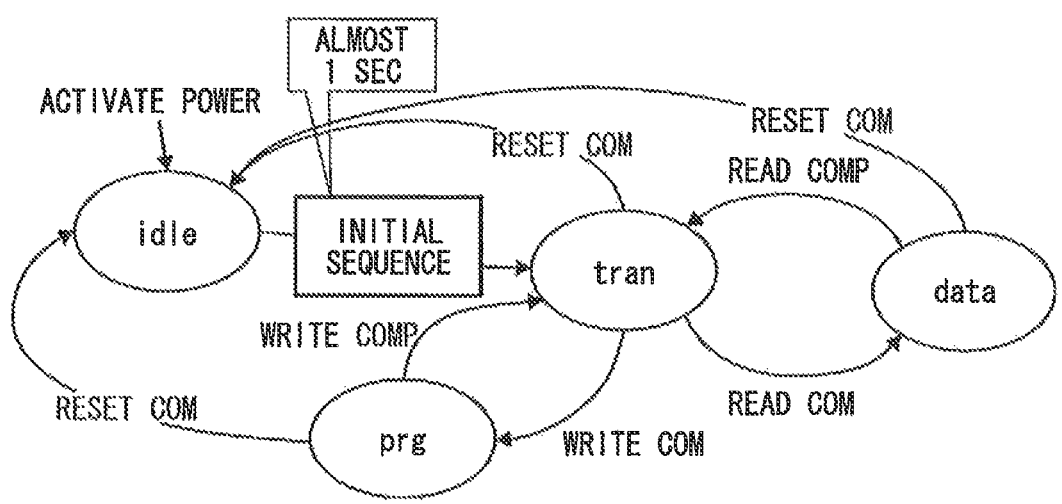
FIG. 9 is a diagram showing a transition state of a SD card.

FIG. 9 shows a transition state of the SD card 7. When the power is activated, the SD card 7 is in the "idle" state. When the CPU 5 initializes the SD card 7, i.e., when the initialization setting process of the SD card 7 is completed, the SD card 7 switches from the "idle" state to the "tran" state so that the CPU 5 can access the SD card 7. In this case, it takes up to one second to switch from the "idle" state to the "tran" state, i.e., to execute an initialization sequence. When the SD card 7 receives a read command from the CPU 5, the SD card 7 switches from the "tran" state to the "data" state. When the read process is completed, the SD card 7 switches from the "data" state to the "tran" state. When the SD card 7 receives a write command from the CPU 5, the SD card 7 switches from the "trail" state to the "prg" state. When the write process is completed, the SD card 7 switches from the "data" state to the "tran" state.

When the SD card 7 receives a reset command from the CPU 5 under a condition that the SD card 7 is in one of the "tran" state, the "data" state and the "prg" state, the SD card 7 switches to the "idle" state.

Successively, the CPU 5 executes the activation process.

Figure 4:
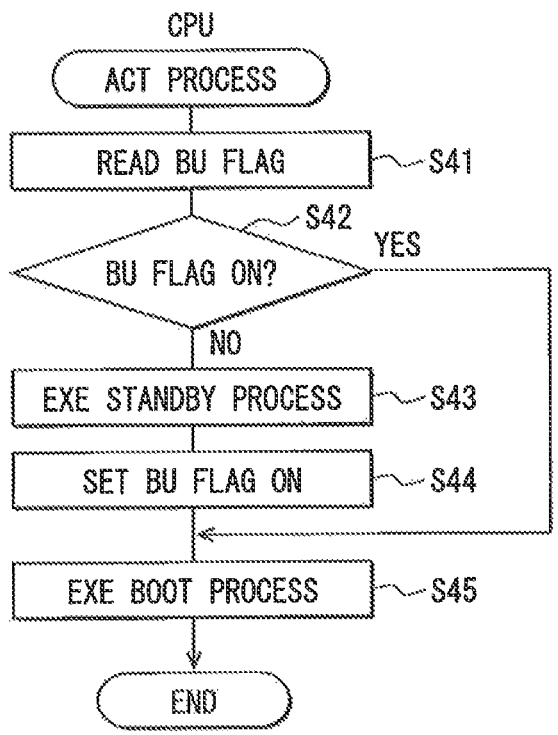
FIG. 4 is a flowchart showing an activation process of the CPU.

FIG. 4 is a flowchart showing the activation process of the CPU 5. The CPU 5 reads the BU flag 3b of the reset sequencer 3 so that the CPU 5 determines whether the BU flag 3b is in the on state. Under a condition that the reset sequencer 3 is activated, the BU flag is in the off state. In this case, a waiting process (i.e., a standby process) is executed. In the standby process, the CPU 5 stands by sufficient time so as to complete the initialization setting process of the SD card 7. For example, the standby time is set to two seconds. After the standby process is completed, the CPU 5 turns on the BU flag 3b. Then, the CPU 5 executes the boot process.

Figure 5A:
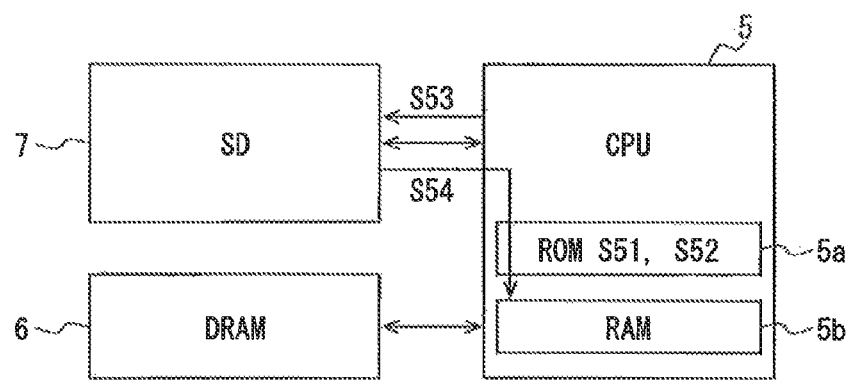
FIGS. 5A and 5B are diagrams showing a boot process of the CPU.
Figure 5B:
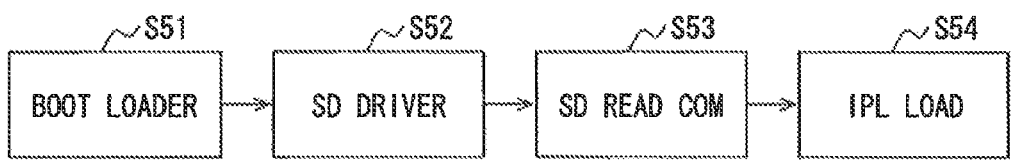
Figure 6A:
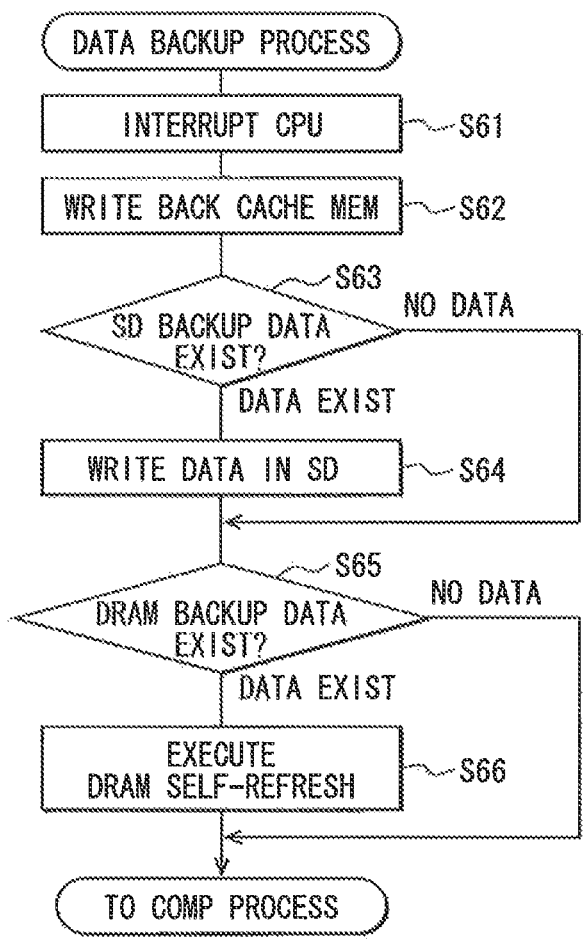
FIG. 6A is a flowchart showing a first procedure of a data backup process.
Figure 6B:
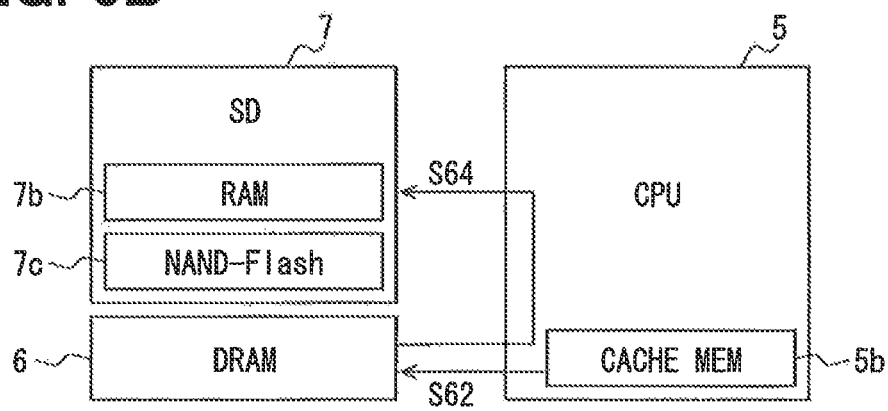
FIG. 6B is a diagram showing the first procedure of the data backup process.

FIG. 5 shows a procedure of the boot process of the CPU 5. The ROM 5a of the CPU 5 preliminarily stores a boot loader and a SD driver. First, the CPU 5 reads the boot loader from the ROM 5a, and the CPU 5 activates the SD driver so as to be capable of accessing the SD card 7. Further, the CPU 5 sets an I/F for communicating with the SD card 7. After that, the CPU 5 sends a read command to the SD card 7 in order to read the IPL. In this case, as described above, since the initialization setting process of the SD card 7 is completed, the CPU 5 can read the IPL from the SD card 7. When the CPU 5 executes the IPL, the CPU 5 can read the OS.

In FIG. 2, the reset sequencer 3, which has reset the CPU 5, stands by the completion of the activation of the CPU 5 in step S6. When time runs out, i.e., when the determination in step S6 is "TIME-OUT," the reset sequencer 3 determines that a failure occurs. In this case, the reset sequencer 3 resets the CPU 5 again in step S7 so that the reset sequencer 3 restarts the CPU 5. When the activation of the CPU 5 is completed, i.e., when the determination in step S6 is "COMPLETE" the reset sequencer 3 switches to the operation mode. In step S8, the reset sequencer 3 monitors whether the CPU 5 functions normally. Then, the reset sequencer 3 determines in step S9 whether the reception state of the accessory-on signal continues. When the CPU 5 does not function normally, i.e., when the determination in step S8 is "NG," the reset sequencer 3 resets the CPU 5 repeatedly in step S7.

Figure 3:
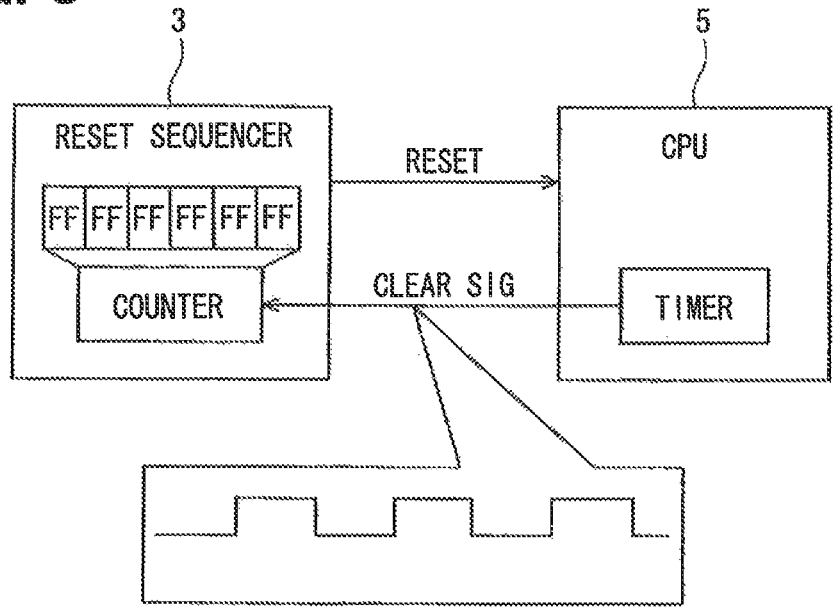
FIG. 3 is a diagram showing a reset operation of a CPU according to the operation of the reset sequencer.

FIG. 3 shows a reset operation for the CPU 5 executed by the reset sequencer 3. After the CPU 5 is activated, the CPU 5 outputs a clear signal to the reset sequencer 3 with a predetermined period, which is counted by a timer. The clear signal is used for a watch dog as a monitoring signal. The reset sequencer 3 executes a counting operation with using a counter. When the reset sequencer 3 receives the clear signal from the CPU 5 within a predetermined specific time, the reset sequencer 3 clears the counter. When the reset sequencer 3 does not receive the clear signal from the CPU 5 within a predetermined specific time, and a counting value is made full (i.e., the counting value is "FFFF . . . "), the reset sequencer 3 determines that the failure occurs, and the reset sequencer 3 resets the CPU 5. The reset operation may be different from this operation. Alternatively, the reset operation may be performed in a different manner.

When the accessory switch turns off (i.e., when the determination of step S9 is "OFF"), the reset sequencer 3 switches to a termination process mode (i.e., a completion process mode). When the reset sequencer 3 is in the termination process mode, the reset sequencer 3 activates a process termination timer (i.e., a process completion timer), and interrupts the CPU 5 so that the data backup process is executed in step S10. Here, the interruption to the CPU 5 corresponds to the backup instruction.

FIGS. 6A to 7B show flowcharts showing data backup procedures. Two different procedures are shown. In the first procedure in FIGS. 6A and 6B, when the reset sequencer 3 interrupts the CPU 5, the CPU 5 writes the data stored in the RAM 5b into the DRAM 6. The RAM 5b functions as a cache memory. The reset sequencer 3 determines whether the backup data for the SD card 7 exists. When the backup data exists, the reset sequencer 3 transfers the backup data in the DRAM 6 to the SD card 7. When there is another backup data exists in the DRAM 6, i.e., when another backup data to be stored in the DRAM 6 instead of the SD card 7 exists, the DRAM 6 is self-refreshed. In the self-refresh process, a refresh circuit in the DRAM 6 automatically refreshes the DRAM 6 itself. When a refresh instruction is input once, the DRAM 6 can maintain the data by merely being supplied electricity to the DRAM 6. Thus, the electric power consumption can be reduced.

Figure 7A:
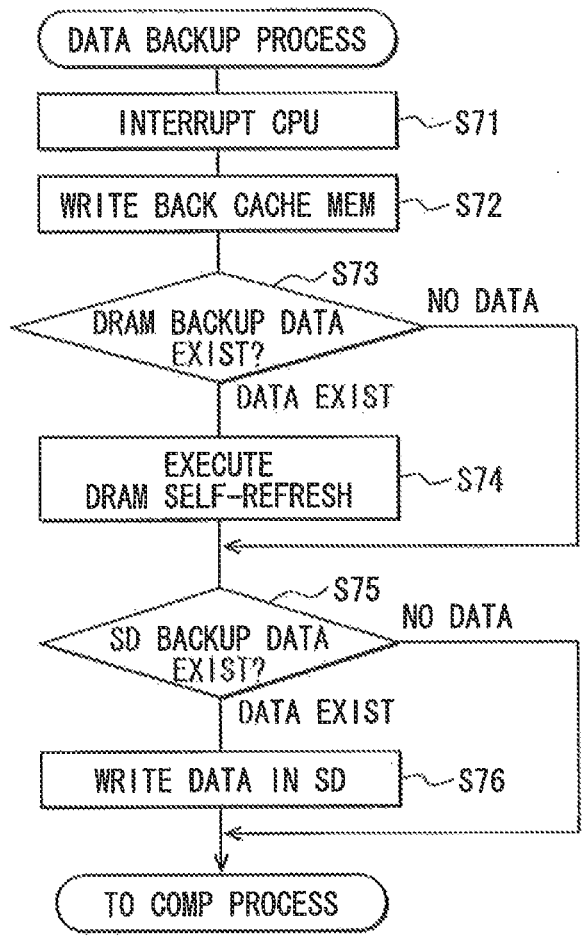
FIG. 7A is a flowchart showing a second procedure of a data backup process.
Figure 7B:
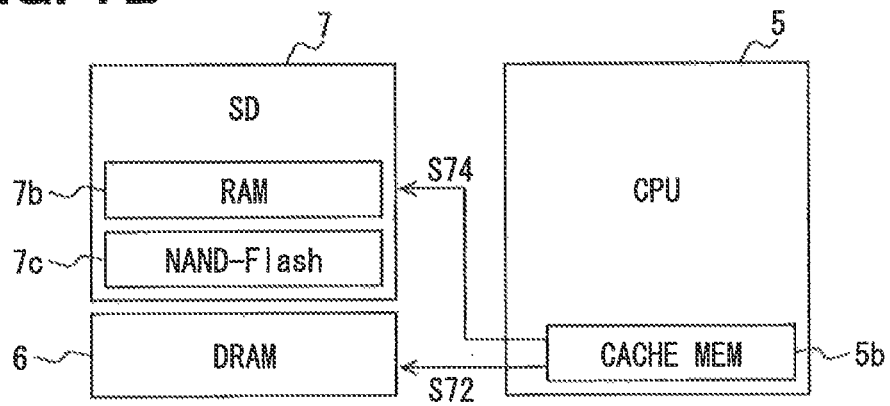
FIG. 7B is a diagram showing the second procedure of the data backup process.

In the second procedure in FIGS. 7A and 7B, when the reset sequencer 3 interrupts the CPU 5, the CPU 5 writes the data in the RAM 5b into the DRAM 6. When another backup data to be stored in the DRAM 6 instead of the SD card 7 exists, the DRAM 6 is self-refreshed. Then, when the backup data for the SD card 7 exists, the reset sequencer 3 writes the backup data into the SD card 7.

According to the above procedures, the reset sequencer 3 backups the data stored in the RAM 5b of the CPU 5, and the backup data is stored in the SD card 7.

In FIG. 2, after the reset sequencer 3 tries to backup the data in the completion process, the reset sequencer 3 determines in step S11 whether the backup is normally completed. When the backup process is normally completed within a predetermined time counted by the timer, i.e., when the determination of step S11 is "OK," the reset sequencer 3 sets the BU End flag to be "1" in step S12. Then, in step S14, the reset sequencer 3 clears the timer, and shuts off the power source 4 so that the CPU 5 stops functioning. When the time runs out, i.e., when the determination in step S11 is "NG," the reset sequencer 3 determines that, the failure occurs. Then, in step S13, the reset sequencer 3 shuts off the power source 4. Further, the reset sequencer 3 controls the power source switch 2 to turn on and off, so that the reset sequencer 3 resets the SD card 7. Thus, the controller 7a of the SD card 7 executes the initialization setting process without waiting for the next accessory-on action. The failure state is solved, and the apparatus 1 is ready for the next activation, i.e., the next accessory-on action. Specifically, when the next accessory-on action arises, the initialization setting process has been completed already. Therefore, the boot process is immediately executed, and the apparatus can respond to an external instruction rapidly.

The factor of failure state such that the backup is not normally completed may be a failure of the SD card 7 or a failure of the CPU 5. When the SD card 7 is reset, the failure of the SD card 7 is solved. In a case where the backup is not normally completed because of the CPU failure, even when the Sd card 7 is reset, the failure may not be solved.

In the present embodiment, the reset sequencer 3 halts the energization instruction to the power source 4, i.e., in step S14, application of 1.1 volts, 1.8 volts or 3.3 volts to the CPU 5 is shut off. Thus, the reset sequencer 3 switches from the completion process mode to the standby mode, and it returns to step S2. In step S2, the reset sequencer 3 checks according to the BU End flag whether the backup process is completed. When the BU End flag is "1," i.e., when the determination in step S2 is "BU End=1," the reset sequencer 3 determines that the backup is normally completed. Then, the reset sequencer 3 stands by until the activation trigger occurs. In this case, since the SD card 7 is not reset yet, the SD card 7 is in the "tran" state. When the next accessory-on action is input, it is possible to access the SD card 7 for the CPU 5 when the next accessory-on action occurs. When the backup is not normally completed, the BU End flag is "0," i.e., the determination in step S2 is "BU End=0," the reset sequencer 3 skips step S3, i.e., the reset sequencer 3 does not wait for the next accessory-on action. Then, it goes to step S4. In step S4, the reset sequencer 3 controls the power source 4 to function, so that 1.1 volts, 1.8 volts, or 3.3 volts is applied to the CPU 5. After that, the reset sequencer 3 resets the CPU 5 in step S5. When the CPU 5 is reset, the failure occurred in the CPU 5 is solved. Here, when the CPU 5 is reset in step S5, i.e., when the reset process or a restart process is performed in the CPU 5, the initialization process is automatically executed in the SD card 7, i.e., the initialization setting process of the SD card 7 is executed.

When the activation of the CPU 5 is completed in step S6, and the reset sequencer 3 confirms that the CPU 5 normally functions, i.e., the determination in step S8 is "OK," the reset sequencer 3 determines that the CPU 5 functions in the accessory-off state. Thus, the determination of step S9 is "OFF." In this case, it goes to step S10 automatically, and then, the data backup process is executed. When the data backup process is normally completed, i.e., when the determination in step S11 is "OK," the BU End flag is set to be "1" in step S12. Thus, the "tran" state in the SD card 7 continues.

In the above operation, when the data backup process is not normally completed in the accessory-off state, the reset sequence 3 resets the SD card 7 without waiting for the next accessory-on action. Therefore, the initialization setting process will be completed until the next accessory-on action. Therefore, the "tran" state of the SD card 7 is maintained. Thus, when the accessory-on action occurs, the CPU 5 accesses the SD card 7 immediately, and therefore, the software is activated without delay.

Further, the SD card 7 is reset, and the CPU 5 is also reset (i.e., restarted) without waiting for the next accessory-on action. The data backup is repeatedly performed until the data backup process is completed normally. The SD card 7 backups the data correctly and surely.

Here, when the data backup is not normally completed, i.e., when the determination of step S11 is "NG," and it goes to steps S13 and S14, the backup data, which is tried to store in the DRAM 6, may include a failure. Specifically, the data to be stored in the DRAM 6 as the backup data may be improper. For example, the data may be corrupted, or the data may be defective. Therefore, it is necessary to reset the DRAM 6. Thus, in the present embodiment, the reset sequencer 3 halts the energization instruction to the power source 4, i.e., application of 1.1 volts, 1.8 volts or 3.3 volts to the CPU 5 is shut off in step S14. Further, although the power source switch 11 is in the on-state at that moment, the reset sequencer 3 controls the power source switch 11 to turn on and off, so that the energization to the DRAM 6 is interrupted, and then, the DRAM 6 is restarted, i.e., the DRAM 6 is reset. Thus, the failure of the backup data disposed in the DRAM 6, which corresponds to the backup memory, is surely fixed, and the initial state is prepared. Thus, it is ready to backup the data normally in the DRAM 6.

It is necessary to perform a pull-up operation in the data line, the address line and the command line, which are disposed between the SD card 7 and the CPU 5. When the pull-up resistor 9 is connected to the BU power source 8, the CPU 5 may be made unstable since a voltage is bypassed to the CPU 5 from the BU power source 8 under a condition that the CPU 5 is in the halt state.

However, in the present embodiment, the pull-up resistor 9 is connected to the power source line of the CPU 5, i.e., the 3.3 volt line. Thus, under a condition that the energization to the CPU 5 is stopped, the voltage of the pull-up resistor 9 becomes zero, so that the bypassing of the voltage to the CPU 5 is restricted.

When the vehicle is shipped to a consumer as a user of the vehicle, and the user operates to turn on the accessory switch, the initialization setting process of the SD card 7 has been already completed. Thus, the accessory-on operation is performed under a condition that the initialization setting process of the SD card 7 has been already completed. In this case, the BU power source 8 continues to energize the SD card 7. The BU flag 3b of the reset sequencer 3 is in the on-state. As shown in the activation process in FIG. 4, the CPU 5 activated by the reset sequencer 3 immediately executes the boot process without executing the standby process, so that the CPU 5 reads the IPL from the SD card 7. Thus, the CPU 5 reads the IPL from the SD card 7 rapidly, and the CPU 5 performs the IPL so that the CPU 5 reads the OS. The CPU 5 surely responds to a request, which is sent via the in-vehicle LAN.

When the time runs out at the activation time, the reset sequencer 3 controls the CPU 5 to reset the CPU 5. Further, the reset sequencer 3 monitors the CPU 5 whether the CPU 5 functions normally. When the user performs the accessory-off action, the reset sequencer 3 backups the data. When the data backup is not normally completed, the reset sequencer 3 resets the SD card 7. Further, the reset sequencer 3 controls the CPU 5 to forcibly stop the operation of the CPU 5. Furthermore, the reset sequencer 3 stops energizing the DRAM 6, so that the DRAM 6 is reset.

In the present embodiment, the following effects are obtained.

When the data backup is not normally completed, the reset sequencer 3 activates the CPU 5 without waiting for the accessory-on action, so that the SD card 7 switches from the "idle" state to the "tran" state. Thus, the CPU 5 can access the SD card 7 immediately at the next accessory-on operation. Thus, the activation of the software is not delayed.

The CPU 5 determines according to the backup flag whether it is necessary to execute the standby process. Here, the backup flag indicates the on-state or the off-state, and is stored in the reset sequencer 3, which is connected to the BU power source 8. Even when the energization to the CPU 5 is interrupted, the activated CPU 5 surely determines according to the backup flag whether the initialization setting process is completed.

The reset sequencer 3 interrupts the CPU 5 when the accessory-on signal is not received. Further, the CPU 5 backups the data. Thus, the map data stored in the RAM 5*b* of the CPU 5, which is necessary to backup, is memorized in the SD card 7. Further, when the map data can not be stored in the SD card 7, it is determined that the failure occurs, and the reset sequencer 3 halts the power source switches 2, 11 and the power source 4. Therefore, the failure state is fixed, and the initial state is recovered.

When the energization to the CPU 5 is stopped, the voltage of each line, which connects between the SD card 7 and the CPU 5, becomes zero volt with using the pull-up resistor 9. Thus, compared with a case where the pull-up resistor 9 is connected to the backup power source 8, the CPU 5 is restricted from being unstable. Here, in the case where the pull-up resistor 9 is connected to the backup power source 8, the voltage of the backup power source 8 may be bypassed to the CPU 5 via a protection card of each line, which connects between the CPU 5 and the SD card 7, so that the CPU 5 may become unstable.

Second Embodiment

Next, a second embodiment will be explained as follows with reference to FIG. 10. In the second embodiment, when the backup is not normally completed, the SD card 7 backups the data after the CPU 5 is activated.

Figure 10:
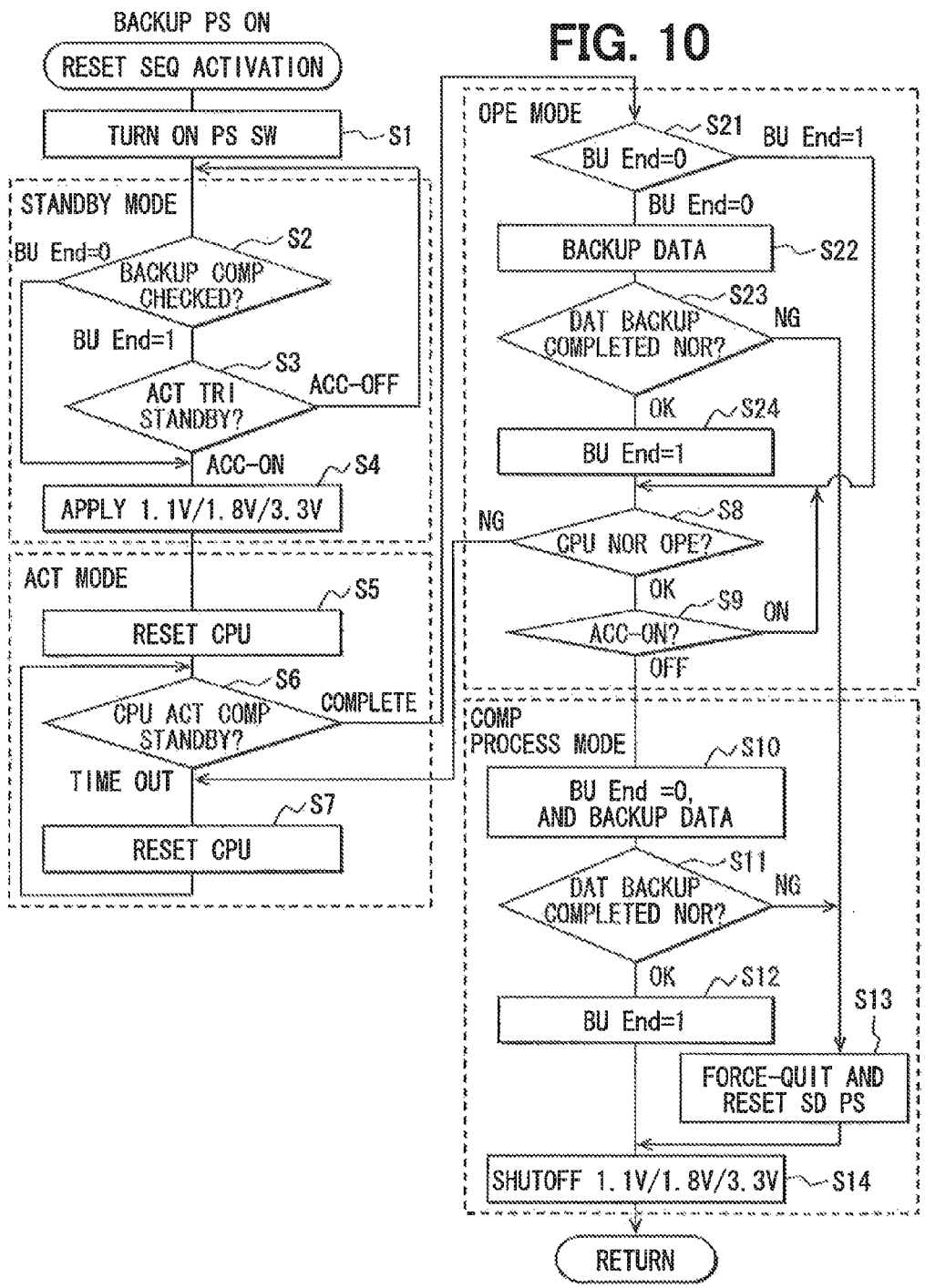
FIG. 10 is a flowchart showing an operation of a reset sequencer according to a second embodiment.

FIG. 10 shows an operation of the rest sequencer 3.

When the activation of the CPU 5 is completed according to the accessory-on action, i.e., when the determination of step S6 is "COMPLETE," the rest sequencer 3 determines in step S21 whether the BU End flag is zero. When the BU End flag is zero, i.e., when the determination of step S21 is "BU End=0," the reset sequencer 3 determines that the data backup is not completed normally. Then, the reset sequencer 3 backups the data in step S22. When the data backup is normally completed, i.e., when the determination of step S23 is "OK," the reset sequencer 3 sets the BU End flag to be "1." Then, it goes to step S8.

When the data backup is not normally completed, i.e., when the determination of step S23 is "NG," the reset sequencer 3 resets the SD card 7 without waiting for the accessory-off action, i.e., step S9 is skipped. Thus, the initialization setting process is executed, and the failure state in the SD card 7 is fixed. At this moment, the SD card 7 switched to the "tran" state. Then, the CPU 5 is restarted, i.e., it goes to step S14, the determination of step S2 is "BU End=0," it goes to steps S4 and S5, and the determination of step S6 is "COMPLETE," When the SD card 7 becomes the "tran" state, the reset sequencer 3 backups the data in the SD card 7 in step S22.

When the data backup is normally completed after the accessory-off action is taken, i.e., when the determination of step S23 is "OK," it goes to step S24, the determination of step S8 is "OK," the determination of step S9 is "OFF," it goes to step S10, the determination of step S11 is "OK," and it goes to step S12, the "tran" state of the SD card 7 continues even when the accessory-off action is taken. Thus, at the next accessory-on action, the SD card 7 is in the "tran" state. Thus, the CPU 5 can access the SD card 7 immediately.

In the present embodiment, even when the data backup is not completed normally, the SD card 7 switches from the "idle" state to the "tran" state until the next accessory-on action is taken. Thus, similar to the first embodiment, the CPU 5 can access the SD card 7 immediately just after the next accessory action is taken. Therefore, the activation of the software is not delayed.

Further, the data backup is performed just after the CPU 5 is activated. Therefore, although the data backup is not normally completed once, the data backup is surely completed after the CPU 5 is activated. In the present embodiment, the data backup process is performed twice in steps S22 and S10. Accordingly, the data backup is surely completed.

Other Embodiments

The CPU 5 may determine that the initialization setting process has not been executed when the SD card 7 does not respond at the time of the activation of the power source 4. In this case, the CPU 5 executes the initialization setting process. When the SD card 7 responds at the time of the activation of the power source 4, the CPU 5 may determine that the initialization setting process has been completed. In this case, the CPU 5 executes the boot process without executing the initialization setting process. In this construction, it is not necessary to provide the backup flag in the reset sequencer 3. Accordingly, the structure of the reset sequencer 3 is simplified.

The in-vehicle apparatus may be another system other than the navigation apparatus.

The above disclosure has the following aspects.

According to an example aspect of the present disclosure, an in-vehicle apparatus includes: a memory having a NAND type flash memory and a memory controller, wherein the NAND type flash memory stores a boot program and another program, which is read out according to execution of the boot program, and wherein the memory controller executes an initialization setting process in such a manner that the memory controller searches all of failure blocks in the NAND type flash memory when the in-vehicle apparatus is energized, and manages a relation between a logic block and a physical block with eliminating searched failure blocks; a backup power source for transforming a voltage of a battery to a first voltage, wherein the battery is mounted on a vehicle; a power source switch coupled between the backup power source and the memory so that the backup power source applies the first voltage to the memory when the power source switch is in an on-state; a main power source coupled with the backup power source so that the main power source generates a second voltage based on the first voltage when an energization instruction is input; a main control unit coupled with the main power source; and a power source control unit coupled with the backup power source. The main control unit is activated when the main power source applies the second voltage to the main control unit. The main control unit determines whether the initialization setting process is completed by the memory controller after the main control unit is activated. When the main control unit determines that the initialization setting process is not completed, the main control unit executes a standby, process for waiting for completion of the initialization setting process, and executes a boot process for reading the boot program from the memory after the standby process. When the main control unit determines that the initialization setting process is completed, the main control unit executes the boot process without executing the standby process. When the main control unit receives a data backup instruction, the main control unit stores a backup data in the memory. When the backup power source applies the first voltage to the power source control unit, the power source control unit is activated. When the power source control unit is activated, the power source control unit controls the power source switch to turn on, and switches to an activation trigger standby mode, in which the power source control unit waits for generation of an activation trigger. When the power source control unit is in the activation trigger standby mode, and the activation trigger is generated, the power source control unit inputs the energization instruction to the main power source. When the activation trigger is terminated after an input of the energization instruction to the main power source, the power source control unit inputs the backup instruction to the main control unit. When the main control unit completes the data backup normally, the power source control unit halts to input the energization instruction to the main power source, and switches to the activation trigger standby mode. When the main control unit does not complete the data backup normally, the power source control unit controls the power source switch to turn of and on so that the power source switch is reset, and further, the power source control unit halts to input the energization instruction to the main power source, and inputs the energization instruction to the main power source again.

In the above apparatus, when the battery energizes the backup power source, the backup power source supplies the second voltage to the power source control unit. Thus, the power source control unit turns on the power source switch when the backup power source supplies the second voltage to the power source control unit, so that the backup power source supplies the first voltage to the memory including the NAND type flash memory. Thus, the memory is activated. At this time, the power source control unit inputs the energization instruction to the main power source so that the main power source supplies the second voltage to the main control unit. Thus, the main control unit is activated, and then, the power source control unit is switched to the activation trigger standby mode. Thus, the main control unit is activated, and the main control unit determines whether the memory completes the initialization setting process. Here, an instance where the memory starts to execute the initialization setting process and ends the initialization setting process according to the generation of the activation trigger occurs, in general, at time when the vehicle is manufactured, and the activation trigger is generated at the first time after the battery is mounted on the vehicle and coupled with other equipments in the vehicle, i.e., when the first accessory on operation is executed. At this time, the memory controller in the memory energized by the backup power source executes the initialization setting process such as a searching step for the failure blocks, a generating step of a conversion table between the logic block and a physical block, and the like.

After that, the vehicle is delivered to an user of the vehicle, and the user executes the accessory-on operation, i.e., when the activation trigger is generated, the power source control unit controls the main power source to energize the main control unit so that the main control unit is activated. In this case, since the memory has already completed the initialization setting process, it is not necessary to execute the initialization setting process again although it takes much time to complete the initialization setting process. Thus, the main control unit immediately executes the boot process for reading out the boot program from the memory. After the boot program is executed, the apparatus can immediately respond to an instruction from an external device.

After that, when the activation trigger is terminated, i.e., when the accessory-off operation is executed, the power source control unit inputs the backup instruction into the main control unit. When the main control unit completes the data backup normally, the power source control unit halts the energization to the main control unit. At this time, since the power source switch maintains to turn on, a state that the backup power source energizes the memory is maintained.

When the activation trigger is terminated, the main control unit controls the memory to store the backup data according to the backup instruction. If the main control unit fails to control the memory to store the backup data successfully, the power source control unit determines that the failure occurs, and the power source control unit resets the power source switch. Further, the power source control unit halts to input the energization instruction to the main power source. Thus, the failure state is solved. In this case, since the power source switch is reset so that the power source switch turns off and on, the backup power source immediately energizes the memory just after the backup power source stops energizing the memory. Accordingly, the memory controller of the memory executes the initialization setting process. Thus, even if the data backup is not completed normally after the activation trigger is terminated, the initialization setting process is executed immediately without waiting for the next activation trigger. Therefore, when the next activation trigger is generated, since the initialization setting process has been already completed, the main control unit immediately executes the boot process for reading out the boot program from the memory, so that the boot program is executed immediately.

Alternatively, the power source control unit may store a backup completion determination value, which indicates whether the data backup is normally completed. An initial state of the backup completion determination value indicates that the data backup is not completed. When the backup completion determination value indicates that the data backup is normally completed, the power source control unit halts to input the energization instruction to the main power source, and switches to the activation trigger standby mode. When the backup completion determination value does not indicate that the data backup is normally completed, the power source control unit resets the power source switch, halts to input the energization instruction to the main power source, and inputs the energization instruction to the main power source again. In this case, it is easily determined based on the backup completion determination value whether the data backup is normally completed.

Alternatively, the power source control unit may store an initialization setting process determination value, which indicates whether the initialization setting process is completed. When the power source control unit is activated, the initialization setting process determination value indicates a first initialization setting process determination value. When main control unit is activated, and the initialization setting process determination value is the first initialization setting process determination value, the main control unit determines that the initialization setting process is not completed, and further, the main control unit sets the initialization setting process determination value to be a second initialization setting process determination value after the completion of the initialization setting process. When main control unit is activated, and the initialization setting process determination value is the second initialization setting process determination value, the main control unit determines that the initialization setting process is completed. In this case, since the backup power source energizes the power source control unit, and the power source control unit stores the completion determination value although the main power source stops energizing the main control unit, the activated main control unit surely determines based on the completion determination value whether the initialization setting process is normally complete.

Alternatively, when main control unit is activated, and the main control unit can not access the memory, the main control unit may determine that the initialization setting process is not completed. When main control unit is activated, and the main control unit can access the memory, the main control unit determines that the initialization setting process is completed. In this case, the construction of the power source control unit is simplified since it is not necessary to store the backup completion determination value in the power source control unit.

Alternatively, the in-vehicle apparatus may further include: a backup memory energized from the backup power source and storing the backup data. The main control unit stores the backup data in the backup memory. When the main control unit does not complete the data backup normally, the main control unit determines that a failure occurs, and the main control unit controls the backup power source to stop energizing the backup memory. In this case, since the energization to the backup memory is stopped when the failure occurs, the failure state of the backup data stored in the backup memory is solved, and the backup memory is initialized.

Alternatively, the in-vehicle apparatus may further include: a plurality of lines, which is coupled between the memory and the main control unit; and a power source line coupled between the main power source and the main control unit. One of the plurality of lines is defined as a pull-up line. A pull-up operation of the pull-up line is required by a specification of the memory. The pull-up line is connected to the power source line via a pull-up resistor. In this case, since a predetermined line connecting between the memory and the main control unit is set to be zero volt through the pull-up resistor under a condition that the main control unit is not energized, instability occurred by bypassing a voltage to the main control unit is restricted, compared with a case where the pull-up resistor is connected to the backup power source.

Alternatively, the activation trigger may be provided by an accessory-on operation. In this case, the main control unit can be activated according to the accessory-on operation.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle apparatus comprising:
a memory having a NAND type flash memory and a memory controller, wherein the NAND type flash memory stores a boot program and another program, which is read out according to execution of the boot program, and wherein the memory controller executes an initialization setting process in such a manner that the memory controller searches all of failure blocks in the NAND type flash memory when the in-vehicle apparatus is energized, and manages a relation between a logic block and a physical block with eliminating searched failure blocks;
a backup power source for transforming a voltage of a battery to a first voltage, wherein the battery is mounted on a vehicle;
a power source switch coupled between the backup power source and the memory so that the backup power source applies the first voltage to the memory when the power source switch is in an on-state;
a main power source coupled with the backup power source so that the main power source generates a second voltage based on the first voltage when an energization instruction is input;
a main control unit coupled with the main power source; and
a power source control unit coupled with the backup power source,
wherein the main control unit is activated when the main power source applies the second voltage to the main control unit,
wherein the main control unit determines whether the initialization setting process is completed by the memory controller after the main control unit is activated,
wherein, when the main control unit determines that the initialization setting process is not completed, the main control unit executes a standby process for waiting for completion of the initialization setting process, and executes a boot process for reading the boot program from the memory after the standby process,
wherein, when the main control unit determines that the initialization setting process is completed, the main control unit executes the boot process without executing the standby process,
wherein, when the main control unit receives a data backup instruction, the main control unit stores a backup data in the memory,
wherein, when the backup power source applies the first voltage to the power source control unit, the power source control unit is activated,
wherein, when the power source control unit is activated, the power source control unit controls the power source switch to turn on, and switches to an activation trigger standby mode, in which the power source control unit waits for generation of an activation trigger,
wherein, when the power source control unit is in the activation trigger standby mode, and the activation trigger is generated, the power source control unit inputs the energization instruction to the main power source,
wherein, when the activation trigger is terminated after an input of the energization instruction to the main power source, the power source control unit inputs the backup instruction to the main control unit,
wherein, when the main control unit completes the data backup normally, the power source control unit halts to input the energization instruction to the main power source, and switches to the activation trigger standby mode, and
wherein, when the main control unit does not complete the data backup normally, the power source control unit controls the power source switch to turn off and on so that the power source switch is reset, and further, the power source control unit halts to input the energization instruction to the main power source, and inputs the energization instruction to the main power source again.

2. The in-vehicle apparatus according to claim 1,
wherein the power source control unit stores a backup completion determination value, which indicates whether the data backup is normally completed,
wherein an initial state of the backup completion determination value indicates that the data backup is not completed, wherein, when the backup completion determination value indicates that the data backup is normally completed, the power source control unit halts to input the energization instruction to the main power source, and switches to the activation trigger standby mode, and wherein, when the backup completion determination value does not indicate that the data backup is normally completed, the power source control unit resets the power source switch, halts to input the energization instruction to the main power source, and inputs the energization instruction to the main power source again.

3. The in-vehicle apparatus according to claim 1, wherein the power source control unit stores an initialization setting process determination value, which indicates whether the initialization setting process is completed, wherein, when the power source control unit is activated, the initialization setting process determination value indicates a first initialization setting process determination value, wherein, when main control unit is activated, and the initialization setting process determination value is the first initialization setting process determination value, the main control unit determines that the initialization setting process is not completed, and further, the main control unit sets the initialization setting process determination value to be a second initialization setting process determination value after the completion of the initialization setting process, and wherein, when main control unit is activated, and the initialization setting process determination value is the second initialization setting process determination value, the main control unit determines that the initialization setting process is completed.

4. The in-vehicle apparatus according to claim 1, wherein, when main control unit is activated, and the main control unit can not access the memory, the main control unit determines that the initialization setting process is not completed, and wherein, when main control unit is activated, and the main control unit can access the memory, the main control unit determines that the initialization setting process is completed.

5. The in-vehicle apparatus according to claim 1, further comprising:

a backup memory energized from the backup power source and storing the backup data, wherein the main control unit stores the backup data in the backup memory, wherein, when the main control unit does not complete the data backup normally, the main control unit determines that a failure occurs, and the main control unit controls the backup power source to stop energizing the backup memory.

6. The in-vehicle apparatus according to claim 1, further comprising:

a plurality of lines, which is coupled between the memory and the main control unit; and a power source line coupled between the main power source and the main control unit, wherein one of the plurality of lines is defined as a pull-up line, wherein a pull-up operation of the pull-up line is required by a specification of the memory, and wherein the pull-up line is connected to the power source line via a pull-up resistor.

7. The in-vehicle apparatus according to claim 1, wherein the activation trigger is provided by an accessory-on operation.

* * * * *